US006735982B2

(12) United States Patent
Matthies

(10) Patent No.: US 6,735,982 B2
(45) Date of Patent: May 18, 2004

(54) PROCESSING RELATIVELY THIN GLASS SHEETS

(75) Inventor: Dennis L. Matthies, Princeton, NJ (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 09/904,030

(22) Filed: Jul. 12, 2001

(65) Prior Publication Data

US 2003/0010062 A1 Jan. 16, 2003

(51) Int. Cl.⁷ .............................. B32B 32/00; H05F 3/00
(52) U.S. Cl. ..................... 65/111; 156/273.1; 361/225
(58) Field of Search ................................ 65/36, 111, 23; 156/246, 278, 272.6, 273.1; 361/225; 204/164

(56) References Cited

U.S. PATENT DOCUMENTS 2,476,145 A * 7/1949 Gwyn .......................... 206/62

FOREIGN PATENT DOCUMENTS

JP          9-110458       *   4/1997

* cited by examiner

Primary Examiner—Dionne A. Walls
(74) Attorney, Agent, or Firm—Trop, Pruner & Hu, P.C.

(57) ABSTRACT

Thin glass sheets may be processed in an effective fashion by electrostatically charging the sheets and applying them to an oppositely electrostatically charged carrier sheet. After processing is completed the carrier sheet may be removed and the processed sheet may be applied to its intended application such as to act as the front panel of an electronic display.

22 Claims, 2 Drawing Sheets

# PROCESSING RELATIVELY THIN GLASS SHEETS

BACKGROUND

This invention relates generally to handling relatively thin glass sheets.

Thin glass sheets may be utilized for example in connection with displays for electronic devices. For example, in connection with organic light emitting device (OLED) displays, thin glass sheets may act as the front panel of a display. In some cases, OLED materials may be deposited, together with row and column electrodes, on the thin glass sheet.

In making large displays, a number of display tiles may be formed with such front panels. Those tiles are abutted one against the other. By abutting a large number of such tiles, a relatively large display may be formed.

The display formed in this fashion may be advantageous for a number of reasons including the fact that large displays need not be made from a single substrate. Generally because of the possibility of defects, the larger the substrate that is needed to form the display, the lower the yield per device and the higher the expense per device. By using smaller substrates, which may in turn have a lower chance of defects per wafer, the loss due to defects may be dramatically reduced. By simple probability, a larger wafer would be more likely to have a defect than a similarly designed smaller substrate.

When the individual tiles are butted one against another, seams result. These seams may be visible to the user of the display. In many cases the seams are a distraction and are considered a negative in connection with large displays.

Therefore, it would be desirable to reduce the prominence of seams in such displays. The ability to perceive the seam is a function of how thick is the glass utilized in the front panel. Generally, the thicker the glass, the more easily visible, from some angles, is the seam.

Therefore, it would be desirable to use relatively thin glass in connection with displays as well as other applications. Processing equipment is used to process the glass to fabricate features on the glass, such as the OLED material, the row electrodes, and the column electrodes. Conventional processing equipment is designed for a certain glass thickness. Manufacturing with thinner glass may require special equipment development. This generally may mean that the use of thinner glass may result in a manufacturing cost penalty. If thinner glass could be handled by existing equipment, then there would be a benefit to the display industry and to other industries that use relatively thin glass.

Thus, there is a need for a way to enable easier handling of relatively thin glass sheets.

DETAILED DESCRIPTION

Figure 1:
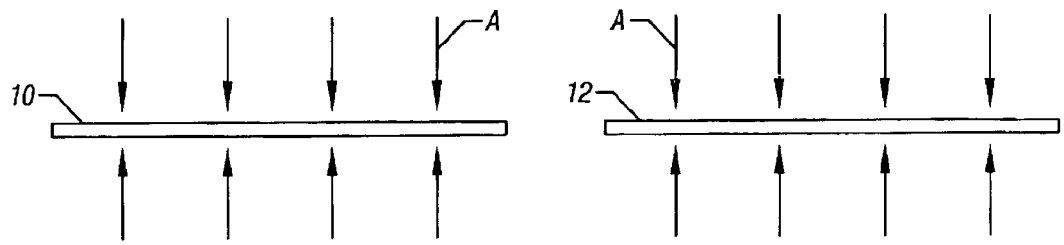
FIG. 1 is a front elevational view of one embodiment of the present invention.

Referring to FIG. 1, a pair of glass sheets 10 and 12 may be electrostatically charged. One of the sheets, such as the sheet 12, may be relatively thinner than the thickness that is most desirable in connection with conventional glass processing equipment. For example, equipment normally utilized to process electronic display panels may be standardized to particular thicknesses. The thickness of a glass sheet 12 may be less than the thickness of glass for which such equipment is designed.

In many applications, relatively thin glass sheets may be more difficult to process than thicker glass sheets. While an embodiment is described herein in connection with the glass for a display panel such as an organic light emitting device (OLED) display, it will be appreciated that many other applications may be implemented with embodiments of the present invention as well.

Initially, a pair of glass sheets 10 and 12 may be thoroughly cleaned as indicated by the arrows A. In one embodiment, the sheets 10 and 12 may be exposed to a liquid cleaner and then dried.

Figure 2:
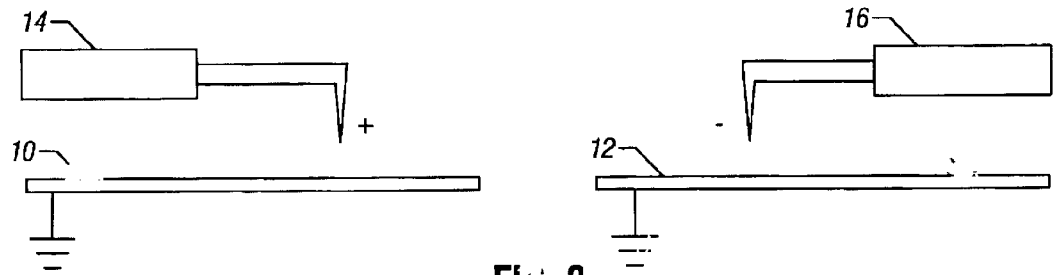
FIG. 2 is a front elevational view of glass sheets being charged in accordance with one embodiment of the present invention.

Referring to FIG. 2, each sheet 10 and 12 may then be subjected to electrostatic charges of opposite polarities in one embodiment. In one embodiment, a charge source 14 may be utilized to apply a positive charge to a grounded sheet 10. For example, the charge source 14 may be a corona source. Similarly, a negative potential is applied by a charge source 16 to the sheet 12 which is also grounded. The charge source 16 may also be a corona source in one embodiment.

The grounding of a sheet 10 or 12 may be accomplished through a conductive coating on one side of a sheet 10 or 12. Alternatively, a sheet 10 or 12 may be grounded by putting it against a ground plate. In some embodiments, it may be preferable to ground a sheet, charge the sheet and then put charged surfaces in contact and thereafter remove the ground, if necessary.

Figure 4:
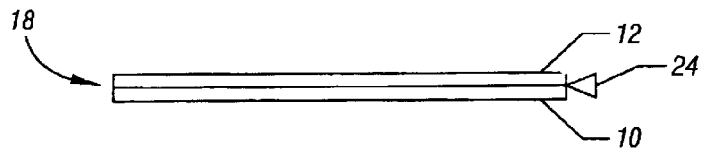
FIG. 4 is a front elevational view of the glass sheets shown in FIG. 2, having been combined, about to be separated in accordance with one embodiment of the present invention.

Once the sheets 10 and 12 are oppositely charged, electrostatic attraction holds the sheets 10 and 12 together as shown in FIG. 4. After the sheets 10 and 12 are put together, the sheet 12 may be processed as part of a composite sheet 18 in the conventional fashion. In some cases, the charge may be positioned on opposed outside surfaces of sheets to be joined. In other cases, the charge may be placed on opposed inside surfaces or adjacent surfaces of sheets to be joined. As still another possibility, charge may be placed on the outside surface of one sheet to be joined and on the inside surface or facing surface of another sheet to be joined. In many cases, placing the charge on facing surfaces may be most advantageous.

In some embodiments, standard processing equipment may be utilized. The standard equipment may be utilized because the thickness of the combined sheet 18 is in accordance with the specifications of that equipment. Thus, the composite sheet 18 may be processed by applying material to the surface of the sheet 12. Such materials, in some embodiments, may include the deposition of row and column electrodes, and organic light emitting materials.

Figure 3A:
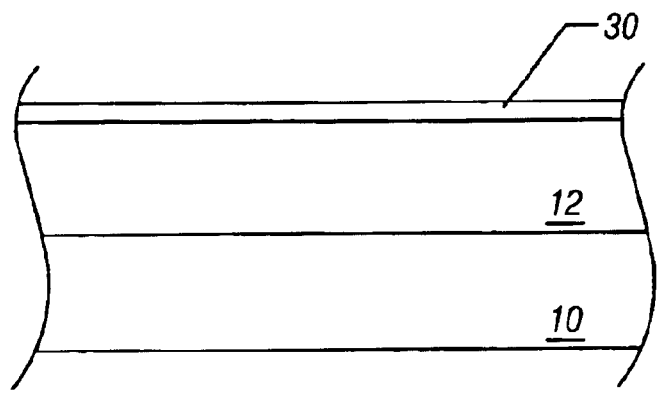
FIGS. 3a through 3c are partial, enlarged, cross-sectional views of the processing of a composite sheet in accordance with one embodiment of the present invention.
Figure 3B:
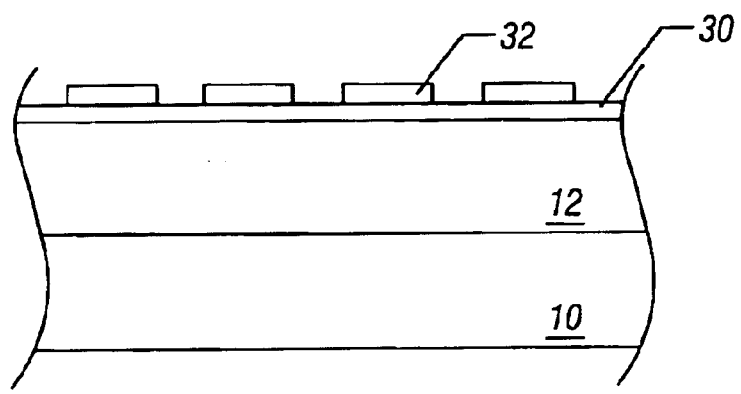
Figure 3C:
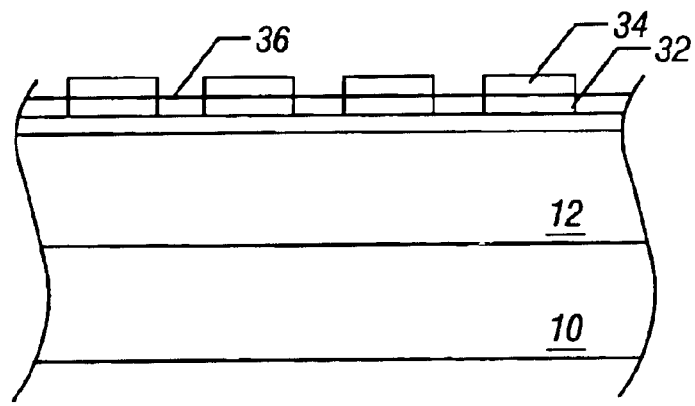

In accordance with one embodiment of the present invention, the combined sheets 10 and 12 may be processed to form a light emitting display. Thus, the sheet 10 acts as a carrier and processing steps are applied to the sheet 12. As shown in FIG. 3a initially, transparent column electrodes may be formed on the surface of the sheet 12. In one embodiment, the column electrodes are transparent conductive material such as indium tin oxide (ITO). Thereafter, an organic light emitting material 32 may be deposited to form light emitting elements of a display as shown in FIG. 3b. An insulating material 36 may be applied and the resulting structure covered with the deposited row electrodes 34. In one embodiment, the row electrodes 34 may extend transversely to the column electrodes 30, as shown in FIG. 3c. The row electrodes 34 in one embodiment may be made of a metal such as aluminum.

Once the processing of the sheet 12 is completed, the combined sheets 18 may be separated. A wedge 24 may be driven between the two sheets 10 and 12, as indicated in FIG. 4, to begin to peel the sheets 10 and 12 from one another, for example at a corner.

Figure 5:
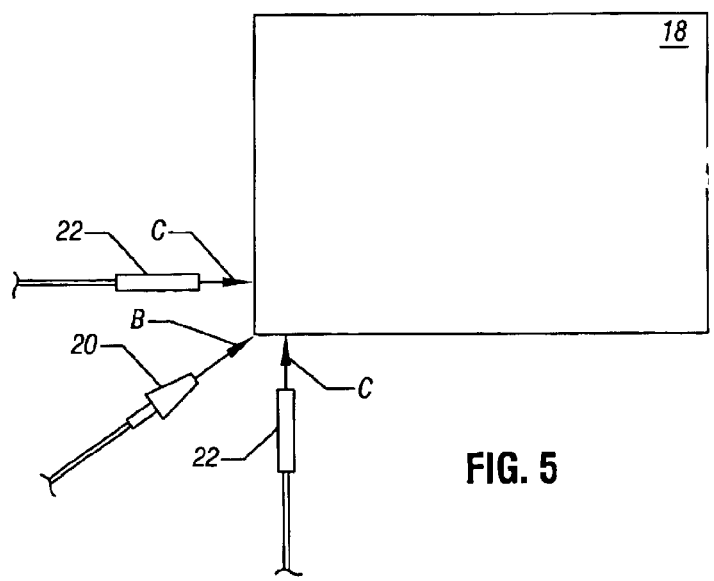
FIG. 5 is a top plan view of a technique for separating the electrostatically joined sheets in accordance with one embodiment of the present invention.

Once the wedge is inserted between the sheets 10 and 12, as shown in FIG. 5, fluid (gas or liquid) sprays may be utilized to continue to peel the two sheets 10 and 12 apart. For example, an air or water spray gun 20 may be used to direct a spray of fluid indicated at B at the partially separated corner region.

Before separation is initiated and/or once the separation is initiated, in some embodiments, a charged gas stream C may be applied from ionized air guns 22. The guns 22 may reduce the charge on the sheets 12 and 10 making up the composite 18.

By using the spray gun 20, the two sheets 10 and 12 may be progressively peeled apart. The carrier sheet 10 may then be reused to carry another sheet 12 processing. The sheet 12 may then be applied in its intended application such as to act as the front panel of an electronic display.

The amount of surface voltage needed will depend on substrate thicknesses. Suitable voltages for substrates of 0.5 millimeters thicknesses are from 500 to 1000 volts in some embodiments. It may be desirable to apply charges of the same magnitude but of opposite polarity to each of the sheets 10 and 12. When sheets, charged to a similar potential of opposite polarity, are electrostatically combined, the net charge on the composite 18 is about zero. Substantial electrical neutrality may reduce the attraction of dust to the composite 18 during processing.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   charging a first glass sheet;
   electrostatically adhering said first glass sheet to a second glass sheet;
   processing one of said sheets while adhered to the other of said sheets; and
   separating said electrostatically adhered sheets.

2. The method of claim 1 including oppositely charging said second glass sheet.

3. The method of claim 1 including separating said first and second glass sheets using a fluid flow.

4. The method of claim 3 including using an ionized air source to discharge said glass sheets.

5. The method of claim 3 including charging each of said sheets to substantially the same but opposite charge magnitudes.

6. The method of claim 5 including charging only one side of each sheet.

7. The method of claim 1 including forming a display panel.

8. The method of claim 1 including using a corona source to charge said glass sheet.

9. The method of claim 8 including grounding said glass sheet.

10. The method of claim 9 including contacting said glass sheet with a ground plate.

11. The method of claim 9 including grounding a conductive layer on said glass sheet.

12. The method of claim 1 wherein separating said electrostatically adhered sheets includes progressively peeling said sheets apart.

13. The method of claim 1 including forming a combined sheet from said first and second sheets that has a thickness compatible with conventional glass processing equipment.

14. A method comprising:
    forming a composite of two electrostatically adhered glass sheets;
    processing one of said sheets while electrostatically adhered to the other of said glass sheets; and
    separating said electrostatically adhered sheets.

15. The method of claim 14 including forming an electronic display.

16. The method of claim 15 including depositing row and column electrodes on one of said glass sheets.

17. The method of claim 16 including depositing organic light emitting material on one of said glass sheets.

18. A method comprising:
    electrostatically charging a first glass sheet;
    electrostatically adhering the first glass sheet to a second sheet;
    forming row and column electrodes on said first glass sheet; and
    separating said electrostatically adhered sheets.

19. The method of claim 18 including forming an organic light emitting material between said row and column electrodes.

20. The method of claim 19 including depositing a transparent electrically conductive material on said first glass sheet.

21. The method of claim 18 including charging said first glass sheet and said second sheet to substantially the same but opposite potentials.

22. The method of claim 21 including adhering said first glass sheet to a second sheet also formed of glass.

* * * * *